United States Patent [19]

Babel

[11] Patent Number: 4,687,088

[45] Date of Patent: Aug. 18, 1987

[54] CUBICLE FOR MACHINING CENTERS

[75] Inventor: Werner Babel, Pfronten, Fed. Rep. of Germany

[73] Assignee: MAHO Aktiengesellschaft, Fed. Rep. of Germany

[21] Appl. No.: 830,968

[22] Filed: Feb. 19, 1986

[30] Foreign Application Priority Data

Feb. 20, 1985 [DE] Fed. Rep. of Germany ....... 3505875

[51] Int. Cl.⁴ ............................................... F16P 1/02
[52] U.S. Cl. ............................... 192/133; 192/129 A
[58] Field of Search ........... 192/133, 143, 149, 129 A, 192/129 R

[56] References Cited

U.S. PATENT DOCUMENTS 4,120,389 10/1978 Erickson ......................... 192/129 A
4,179,987 12/1979 Dohm, Jr. ....................... 192/133 X
4,398,435 8/1983 Van Sice et al. ................ 192/133 X Primary Examiner—William F. Pate, III
Assistant Examiner—Creighton Smith
Attorney, Agent, or Firm—Lahive & Cockfield

[57] ABSTRACT

The object of the invention is a cubicle for machining centers, consisting of a front one or multipart face wall and stationary or multipart side walls (11, 12), which can be designed to be like sliding doors. In order to prevent damage to the side walls or the windows therein through a collision with a workpiece projecting sideways during the machining cycle or during set up, a part of the side walls (11, 12), according to the invention, is designed to swing sideways, so that it can yield way by a pre-determined distance upon impact by a workpiece. At least one emergency switch is installed in the movement range of these side wall parts, which switches off the forward drive of the workpiece table(s) (4) when it is activated.

18 Claims, 5 Drawing Figures

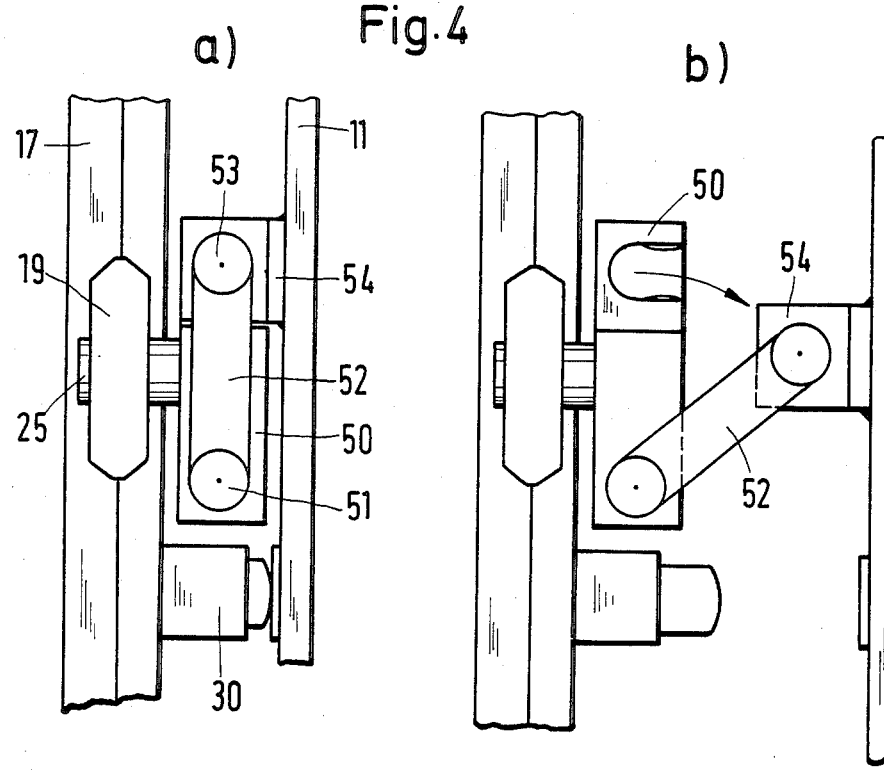
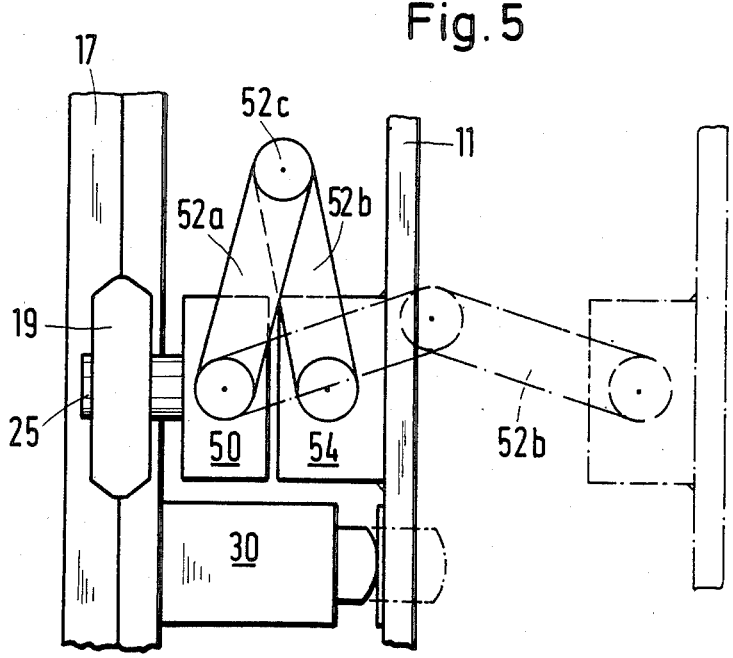

CUBICLE FOR MACHINING CENTERS

The invention concerns a cubicle for machining centers, consisting of a front face wall with at least one sliding door and side walls arranged at the support sides.

Machining centers for the program-controlled machining of workpieces generally have a safety cubicle, which comprises the actual machine tool including its machining range as well as its additional aggregates, such as tool changer, tool magazine etc. In machining centers the various machining processes and thus the movements of the workpiece table as well run automatically according to the workpiece mounted on and the workpiece carrier corresponding to the particular central program. For large size and/or awkward shaped workpieces which project sideways over the workpiece table, it can occur that the programmed horizontal driving distances of the table are greater than the open space between the sideways workpiece corners and the side walls of the workpiece cubicle. In such cases there are then collisions of the workpiece with the cubicle wall during machining, which can lead to damage of one or the other piece part or even the forward drive mechanism for the table.

It is the task of the invention to design a cubicle for machining centers in such a way that such damages through collisions of the mounted workpiece against the cubicle side wall are prevented.

This task is solved according to the invention in that at least part of the side walls are designed to swing and that within this swinging range each side wall has an emergency switch for the driving of the workpiece table.

If, during the execution of the various machining processes, a bulky workpiece mounted on the work piece table is moved in such a way sideways that its outermost edge knocks against the side wall, this side wall swings sideways upon impact by a pre-determined distance and thereby activates the emergency off switch, which can be designed as a customary press switch. The swinging mechanism of the side wall part can be designed and dimensioned in such a way that upon impact of the workpiece to the side wall part neither the one nor the other is damaged.

According to the size and the type of the machining center, the swinging side wall parts can extend over the entire cubicle height, like sliding doors, or they can also be designed as swinging or tiltable windows. The latter design is recommended for safety cubicles with solidly built side walls, which allow observation of the working area of the machine from the side through such windows.

A functional design of the invention is characterized by the fact that the side wall parts are driven on horizontal safety rails that are stationary on top sideways to the supports, whereby these safety rails have a C-shaped profile, which prevents the track rollers with a double conical running surface from being pushed out during impact of a workpiece with this side wall part. The bearing necks of these double conical track rollers are advantageously fastened to the upper end section of the respective side wall part by way of elastically flexible elements, so that upon impact of the workpiece the upper side wall can swing out, without the track rollers being pushed out of the stationary horizontal safety rail. The press switches are fastened functionallly to the longitudinal carrier of the safety rail and are activated by appropriate rams when the side wall swings out. They can also be fastened onto the side wall, however, and can function against a stationary rail with their switching rams.

Instead of the spring elements (leaf springs), the bearing necks of the track rollers can also be connected with the side wall part by way of swinging levers, whereby the stability is improved in the swing position with a simple design and the swinging path can also be increased by an appropriate choice of lever length. The swinging levers can be joint levers, scissor levers etc.

The elastic elements can enclose the track roller necks in the form of pressure springs or they can be designed as leaf spring shackles, which are fastened for one at the side wall and for another at the track roller neck.

For the prevention of collisions, there is the possibility, aside from using emergency switches that are mechanically activated by the swinging of the side walls, of using electro-optical sensors, for instance photo-cells, which are arranged in the interior immediately in front of the side walls and which switch off the forward drive of the workpiece table as soon as an object makes contact with the light beam.

In the following preferred design models of the invention are described in detail using figures.

FIG. 1 schematically shows a machining center in front view without face wall.

FIGS. 4, 5 show further designs of a side wall suspension in top view of the cubicle.

Figure 1:
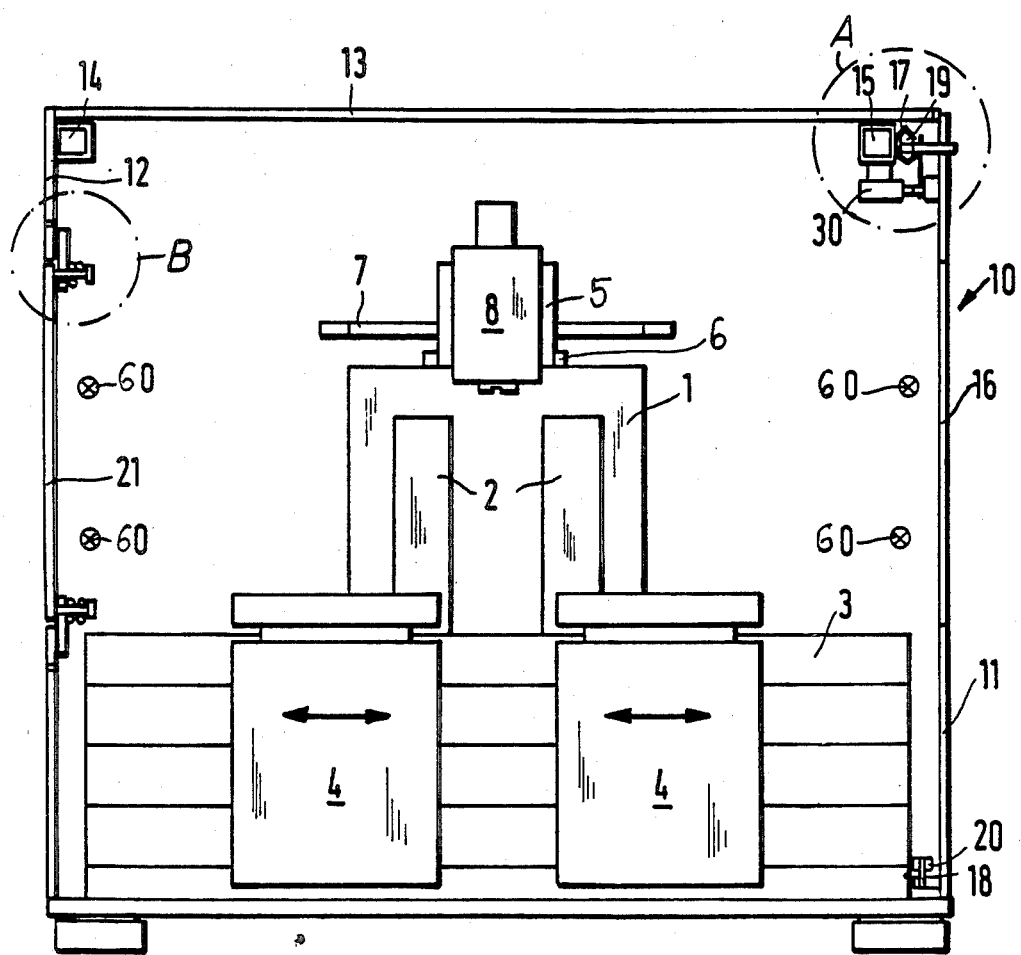

The machining center shown in FIG. 1 contains a machine support 1, on whose face side a console 3 is arranged in vertically drivable manner by way of vertical rails 2. This console 3 supports a workpiece table 4, which is held onto the console 3 in a manner that it can be moved sideways by way of drives (not shown). A spindle head 5 in horizontal rails 6 is movably positioned on the upper side of the support 1; on the upper side of the spindle head a workpiece magazine 7 is mounted and on its face side a vertical cutter head 8 is mounted. The machine tool is located in a safety cubicle 10, which consists of two side walls 11 and 12, a multipart face wall (not shown in FIG. 1), a cover plate 13 and a frame shell, of which only two upper bearers 14 and 15 are shown in FIG. 1.

In FIG. 1 the right side wall 11 is designed as a sliding door with a window 16 extending over the entire cubicle height and can be horizontally moved on an upper C-profile safety rail 17 and on a lower safety rail 18 by means of track rollers 19 and 20 in order to completely free up the working area. The details of this design are shown. The left side wall 12 of the safety cubicle 10 of FIG. 1 is solidly mounted on the upper support element 14 and on a lower transverse support element and has a tilting or sliding window 21 at an operational height, whose pane is fastened in a swinging manner as shown in FIG. 3 against the window frame to go sideways with the impact of a workpiece and thereby activates an emergency switch.

Figure 2:
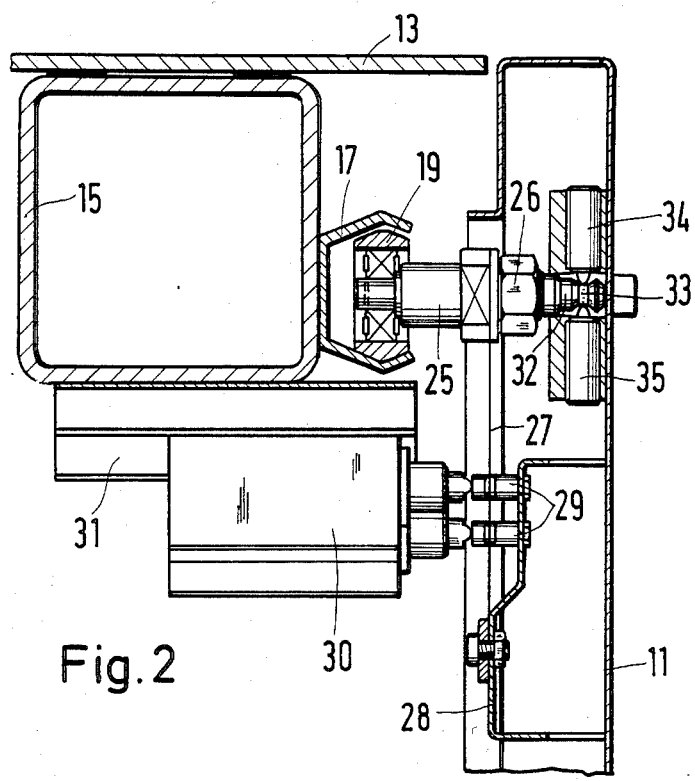
FIG. 2 shows the suspension of a side wall in an enlarge vertical view—Detail A in FIG. 1.

As can be seen in FIG. 2, the horizontal safety rail 17 fastened on the upper longitudinal support element 15 has a C profile. At least two guide rollers 19 run on this safety rail, whose double conical shape is fitted to the safety rail profile and prevents a slipping out along the axial direction of their bearing necks 25. Each bearing neck 25 of the track rollers 19, of which at least two are provided with horizontal spacing in-between, is fastened to the upper part of a leaf spring 27 by way of a screw connection 26. At their lower ends the leaf spring 27 is connected with a curved suport 28 by means of riveting, screwing or welding, to which two thrust pieces 29 for the activation of the emergency switches 30 are attached. These emergency switches 30 are screwed to the lower side of the support element 15 by means of a mounting rail 31. As shown, the bearing neck 25 has an annular groove 33 in a more narrow end section 32, in which are inserted the rounded-off heads of the two thrust pieces 34, 35, which are under spring pressure and are fastened with their casings to the interior side of the side wall 10.

If a projecting workpiece hits against the side wall 10 through too wide a horizontal movement of the workpiece table 4, this side wall can swing out due to the upper suspension shown in FIG. 2, since the track roller 20 runs on a vertical guide surface 18 at its lower end. In such a swinging motion the upper end section of the side wall 10 is also moved sideways under elastic deformation of the leaf springs 27, which results in a corresponding activation of the emergency switches 30 through the thrust pieces 29. At the same time, the rounded-off heads of the springably supported thrust pieces 34, 35 slide out of the crowned groove 33.

Figure 3:
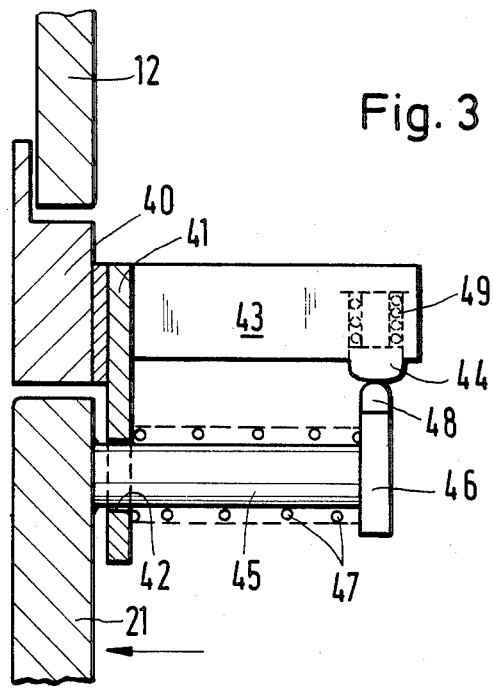
FIG. 3 shows another model of the invention for stationary side walls in an enlarged vertical view—Detail B in FIG. 1.

FIG. 3 is an enlarged section B of FIG. 1 and shows a design model in which the side wall 12 of the cubicle is mounted tightly and immovably and has a swinging or sliding door with a window 21. On the door frame 40 is fastened a flat steel piece 41 on the interior which projects into the window cavity and has openings 42 in this projecting part. Directly on the steel piece or also on the frame is fastened at least one switch 43 with a spring-loaded thrust piece 44 projecting transversely. On the interior of the window 21 in its edge section are fastened necks 45 with broadened heads 46 in a fixed way, which are enclosed by a pressure spring 47 supported on one end by the flat steel piece 41 and on the other end by the broadened head 46. The necks 45 project loosely through the appropriate bore holes 42 in the flat steel piece 41. A nose 48 is located sideways on at least one head 46 and works together with the crowned head of the thrust piece 44.

If a workpiece is moved, during a machining process or during a palette switch, sofar sideways that its protruding parts knock against the window 21, then it is pressed sideways toward the outside —left in FIG. 3 —, as against the position shown in FIG. 3, whereby the neck 45 is taken along with the compression of the spring 47 and is displaced in the bore hole 42 of the flat steel piece. With that the nose 48 gets out of contact with the crowned head of the thrust piece 44, which is pushed out by a pre-determined distance under the force of spring 49 and thus activates the emergency switch 43, which then switches off the forward drive for one or the other working table 4.

In the design model shown schematically in FIG. 4 in top view the bearing necks 25 of the track rollers 19 running in the C profile rails 17 are fastened to pillow blocks 50. A mouth with a spring catcher is attached to one end part of every pillow block 50 and a vertical hinge bolt 51 is attached to the other end, which is connected in a turning manner for one part of its length with a swinging lever 52. The other end of the swinging lever 52 makes contact with a hinge pin 53, which is supported on a holding device 54 fastened internally on the wall part 11. The wall holding device shown thus forms a so-called double hinge and causes a sideways swinging motion of the wall part 11 out of the normal position of FIG. 4a, should a workpiece project out, into the laterally shifted position according to FIG. 4b, in which the emergency switch 30 is then activated by the release of their rams and thus the drive mechanism of the workpiece table, or the electric supply of the entire machine tool, is switched off.

The model shown schematically in FIG. 5 corresponds in its functional principle and in its construction, such as the side wall holding device, to FIG. 4. As in the previously described figures, here too uniform piece parts with uniform reference symbols are provided. Stable holding devices 54 are attached to the interior of the wall part 11, and hinge pins 53 are inserted in them. Instead of a single swinging lever 52, however, two swinging arms 52a, 52b in the form of a toggle lever joint are provided. This model requires an additional hinge bolt 53a, but its has the advantage of greater swinging ranges of the wall parts 11, 12 from the left position shown with continuous lines to the right position shown with dotted lines without a simultaneous movement of the side wall parts 11 in longitudinal direction, as has to be forcibly the case with the holding device according to FIG. 4a, 4b.

The side wall holding devices shown in FIGS. 2, 4 and 5 can also be provided at the lower edge of the side wall parts when using appropriate profiled guide rails.

The invention is not restricted to the previously described design models. The emergency switches, for example, can be arranged in different ways, as long as they are only activated by the swinging movement of the side wall part and/or the door and switch off the forward drive as much as possible without delay. Instead of the purely mechanical press switches, other switching arrangements with photo-electric sensors can be used, which are positioned in the interior with little distance from the side walls are activated as soon as a workpiece penetrates the light beam. Two photo-cells 60 each are shown in FIG. 1 in the driving range of each side wall.

I claim:

1. An enclosure for a machining center of the type wherein a workpiece is mounted on a table which moves in a direction of motion during machining, and wherein the enclosure includes front and side walls supported by a frame, such enclosure being characterized in that
    at least a portion of a side wall is spring-mounted for non-destructive movement along the direction of motion when said portion is contacted by the workpiece; and
    the enclosure has mounted thereon a switch responsive to the motion of the workpiece against said portion, for stopping motion of the table.

2. An enclosure according to claim 1, wherein said spring-mounted portion includes a window.

3. An enclosure according to claim 2, wherein the side walls are movably guided on horizontal guide rails born by the support frame.

4. An enclosure according to claim 3, wherein the guide rails include an upper horizontal guide rail have a C profile, and wherein the enclosure also includes a tracking mechanism, comprising at least two spacedapart track rollers guided within the C profile and having bearing necks extending from the track rollers and elastically connecting to an upper end section of said side wall for spring-restrained motion of the side wall.

5. An enclosure according to claim 4, wherein the side wall is suspended from the guide rail for motion in limited oscillatory way and wherein the switch incudes a plurality of press switches attached to a bar along the guide rail, said side wall further having a ram structure fastened thereto and located for contacting the press switches.

6. An enclosure according to claim 5 wherein the bearing necks are connected to the side wall by a leaf spring.

7. An enclosure according to claim 5, wherein the bearing necks are connected to the side wall by spring-biased levers.

8. An enclosure according to claim 7, wherein each track roller neck is attached to a block having a pivot bolt, and wherein a lever is mounted at one end to pivot about the pivot bolt, and at a second end to a hinge pin attached to the side wall.

9. An enclosure according to claim 8 wherein the spring-biased levers are knee joint levers.

10. An enclosure according to claim 6 or 7, wherein each track roller neck has an annular groove therein for releasable quick-connect coupling with mating spring-biased press pins, and wherein the side wall includes horizontally spaced recesses having such mating spring-biased press pins therein, for releasably coupling the side wall to the roller necks.

11. An enclosure for a machining center of the type wherein a workpiece is mounted on a table which moves in a direction of motion during machining, and wherein the enclosure includes front and side walls supported by a frame, such enclosure being characterized in that the enclosure has mounted thereon at a predetermined distance from a said side wall a photo-sensing switching device for sensing movement of the workpiece within said predetermined distance and operative in response thereto to stop motion of the table.

12. An enclosure according to claim 11, wherein the side walls are movably guided on horizontal guide rails born by the support frame.

13. An enclosure according to claim 12, wherein the guide rails include an upper horizontal guide rail having a C profile, and wherein the enclosure also includes a tracking mechanism, comprising at least two space-apart track rollers guided within the C profile and having bearing necks extending from the track rollers and elastically connecting to an upper end section of a said side wall for spring-restrained motion of the side wall.

14. An enclosure according to claim 13 wherein the bearing necks are connected to the side wall by a leaf spring.

15. An enclosure according to claim 13, wherein the bearing necks are connected to the side wall by spring biased levers.

16. An enclosure according to claim 15, wherein each track roller neck is attached to a block having a pivot bolt, and wherein a lever is mounted at one end to pivot about the pivot bolt, and at a second end to a hinge pin attached to the side wall.

17. An enclosure according to claim 16 wherein the spring-biased levers are knee joint levers.

18. An enclosure according to claim 14 or 15, wherein each track roller neck has an annular groove therein for releasable quick-connect coupling with mating spring-biased press pins, and wherein the side wall includes horizontally spaced recesses having such mating spring-biased press pins therein, for releasably coupling the side wall to the roller necks.

* * * * *

UNITED STATES PATENT AND TRADEMARK OFFICE
CERTIFICATE OF CORRECTION

PATENT NO. : 4,687,088
DATED : August 18, 1987
INVENTOR(S) : Werner Babel

It is certified that error appears in the above-identified patent and that said Letters Patent is hereby corrected as shown below:

Column 1, lines 16 - 17, replace "contral" with --control--.

Column 2, line 58, after "shown" insert --enlarged in Fig. 2--.

Signed and Sealed this

First Day of December, 1987

Attest:

DONALD J. QUIGG

Attesting Officer

Commissioner of Patents and Trademarks